Oct. 25, 1938.          W. JONES                2,134,304
                     BELT FASTENING
              Filed Oct. 1, 1936              2 Sheets-Sheet 1
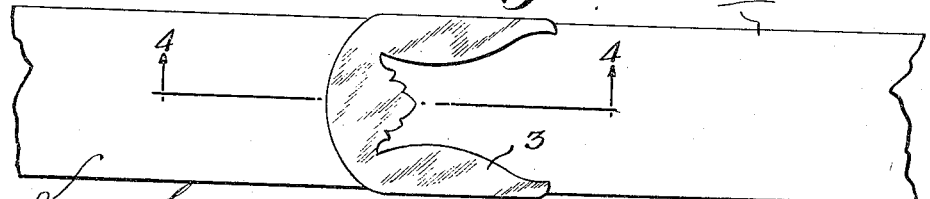
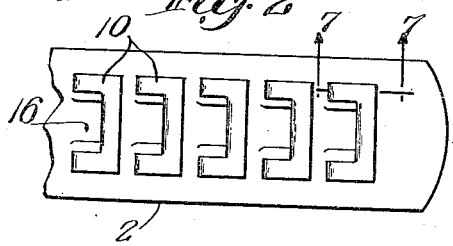   
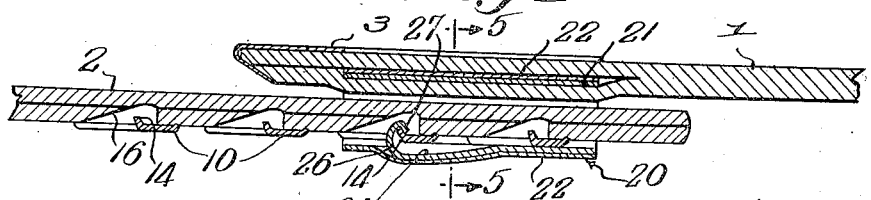
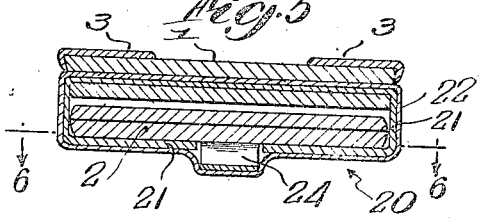   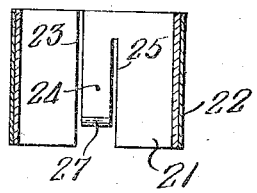
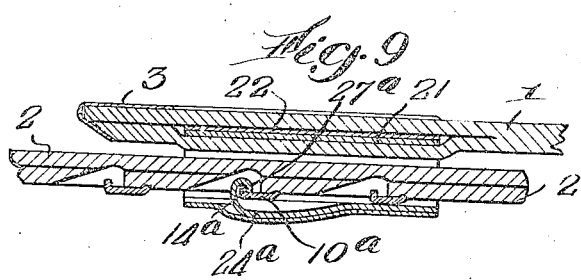   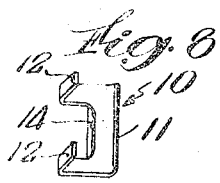
Inventor:
Webster Jones.

Oct. 25, 1938.                W. JONES                    2,134,304
                            BELT FASTENING
                         Filed Oct. 1, 1936            2 Sheets-Sheet 2

Patented Oct. 25, 1938

2,134,304

UNITED STATES PATENT OFFICE 2,134,304

BELT FASTENING

Webster Jones, Norwood, Mass.

Application October 1, 1936, Serial No. 103,498

9 Claims. (Cl. 24—206)

This invention relates to fastening means for belts, straps and the like, and more particularly to such fastening means which may be employed with overlapping belt ends and be arranged in concealed position, thus affording a neat, unobtrusive appearance, either permitting plain belt ends to be arranged in overlapped relation or to be provided with any desired decorative effect which is not limited by the structure of the concealed fastening means.

To permit these desirable results, the belt end which is to be disposed in the overlapping position is provided with a bail member which affords a part to receive the overlapped end in slidable interfitting relation therewith. The bail member preferably is provided with fastening means on its inner or bight portion to engage complementary fastening means on the inner surface of the overlapped section. Thus the fastening means may be concealed from view, not only at the front of the belt or the like, but also at the edges thereof, so that a singularly unobtrusive appearance is provided.

Preferably the fastening means may be controlled by pressure directed toward the overlapping belt section at the bight portion of the bail member, the fastening means conveniently comprising a suitable hook, tab, or protuberance which may interlock with a complementary recessed element or retainer on the inner surface of the overlapped belt section. Thus, for example, the overlapped end may be provided with a plurality of separate metal retainers which have inwardly projecting portions behind which a part of the tab or protuberance may project. This protuberance may be resiliently supported so that it may be controlled in response to the pressure imposed at the face of the bail member; thus such pressure may be required to lock and/or unlock the fastening means.

Such an arrangement permits the bail member to be disposed near the extreme end of the overlapping member, so that despite various conditions of adjustment there is only a short free overlapping portion extending beyond the fastening means. Such a fastening arrangement is particularly adapted to be employed for belts used for supporting articles of apparel or garments, such as trousers, but it also may be used for various other types of belts or strap means such as are employed about the wrists or ankles or which are employed in harnesses or similar locations.

In the accompanying drawings:

Fig. 1 is an elevational view of a belt end assembly secured in accordance with this invention;

Fig. 2 is an elevational view of one overlapped belt end with a portion of the belt broken away;

Fig. 3 is a similar view of the other overlapping belt end with a portion of the belt broken away;

Fig. 4 is a section on line 4—4 of Fig. 1;

Fig. 5 is a section on line 5—5 of Fig. 4;

Fig. 6 is a section indicated by line 6—6 of Fig. 5 but showing only the fastening means employed for the overlapping belt end;

Fig. 7 is a section on line 7—7 of Fig. 2;

Fig. 8 is an isometric detail of one of the fastening elements shown in Figs. 2 and 7;

Fig. 9 is a view similar to Fig. 4, but showing an optional form of the invention;

Fig. 10 is a view similar to Fig. 1 but showing an optional arrangement;

Figs. 11 and 12 are views similar to Figs. 2 and 3, respectively, but showing the optional embodiment of the invention provided in Fig. 10;

Fig. 13 is a section on line 13—13 of Fig. 10;

Fig. 14 is a section indicated by line 14—14 of Fig. 13;

Fig. 15 is an isometric detail of a portion of the fastening means shown in Figs. 10 to 14;

Fig. 16 is a cross-sectional view of the same on line 16—16 of Fig. 15;

Fig. 17 is a detail view, corresponding to Fig. 8, of the fastening means shown in Fig. 11.

In accordance with this invention overlapping belt or strap sections or the like may be secured together by effective concealed fastening means, such fastening means being arranged to permit any desired range of adjustment in degree of overlap and preferably being arranged so that the overlapping belt end does not have a free extremity of substantial length, as is the case when a conventional belt is drawn tight. The arrangement of such overlapping belt sections is shown in Fig. 1, the overlapping section 1 extending over the end 2. As shown in this figure, a decorative sheet metal element 3 may be secured to the belt section 1; this element, however, need have no direct relation to the fastening means.

The overlapped belt end 2 may be provided with a plurality of recessed portions to engage a suitable tab or protuberance provided on the overlapping end 1. Thus, for example, as shown in Figs. 2, 4, 7 and 8, separate sheet metal retainers 10 may be secured at the inner surface of the overlapped belt end 2. Such members may have the general form shown in Fig. 8 before they are applied to the belt, being of generally U-shaped form but having inturned protuberances 12 at the ends of the legs of the U. The outer edge of the intermediate part of the U-shaped member may be provided with a small inwardly inclined flange 11, while the inner edge thereof may be provided with a somewhat deeper lip 14. The members 10 may be secured to the belt end 2 by embedding the projections 12 in the material of the belt end. Thus, for example, the belt may conveniently be split or be formed of two plies of leather and the projections 12 may extend through the inner ply and have bent end portions received between the inner and outer plies, as shown in Fig. 7, while the edge of inclined flange 11 may also be pressed into the leather.

As shown in Fig. 4, recesses 16 preferably are formed in the inner surface of the material of the belt section 2. Thus these recesses may be provided by cutting away the material of the inner ply and, if desired, as shown, may also be provided with an increased depth by removing some material from the inner surface of the outer ply. The lips 14 preferably project into the deeper parts of these recesses.

The overlapping belt section 1 is provided with a bail member, designated in general by numeral 20, through which the overlapped end 2 of the belt may slide. This bail member may conveniently be provided by a metal box-like part 21 covered with leather 22 or other material matching the material of the belt. The box-like member has a wall which together with its leather covering exends between the split end portions or plies of the belt end 1, as shown in Fig. 4, the extremities of these portions being glued or otherwise secured together. The inner wall of the box-like member 21, which defines the bight portion of the bail member, is split as designated by numeral 23, Fig. 6, and a central tongue 24 is provided between this split portion and the slot 25. This integral tongue is resilient and is provided with an outwardly inclined and curved end portion 26 having a hook-like extremity 27 (Fig. 4) which, when the belt ends are secured together, is in interlocking engagement with the lip 14 of one of the retainers 10.

Obviously, as shown in Fig. 4, the leather covering 22 for the bail member conceals the hook 24 which in effect forms a tab interlocking with any one of the lips mounted on the overlapped belt end. Preferably this tab normally springs away from the position shown in Fig. 4 and must be pressed toward the overlapping belt end in order to secure an interlocking engagement. The hook-like end of this tab engages an inclined surface of the lip 14 so that, when a relatively longitudinal movement of the belt ends is effected, i. e., the section 2 is moved toward the right as viewed in Fig. 4 and/or the section 1 is moved toward the left, these parts have a cam-like engagement causing the tab to be released from the retainer 10 so that the belt end 2 may then slide through the bail member 20 to unhook the two belt ends so that they may then be separated from each other by pulling them apart.

Obviously when the belt sections are to be reconnected the end of the overlapped section 2 is inserted within the bail member 20 and the sections are slid past each other until the desired degree of overlap is attained; thereupon the tongue 24 is pressed toward the inner surface of the overlapped section 2 and the belt ends slid relative to each other until the hook 27 catches under an adjoining retainer 10. The pressure upon the tongue 24 is then released and the hook 27 firmly engages the lip portion 14 of the corresponding retainer.

It may be noted that the bail member 20 extends slightly beyond the edges of the body portion of the overlapping belt end 1 but that, as shown in Fig. 1, the decorative member 3 may similarly extend beyond the member 1, thus concealing the edges of this bail member from view at the front of the belt. Furthermore the member 3 may be conveniently held in place by tabs 3ª, which abut the rear edges of the bail 20, the endwise movement of the member 3 being prevented by the bail member 20 which projects from the belt section adjoining the tabs 3ª.

Fig. 9 illustrates an optional embodiment of the invention which is similar to that shown in Fig. 4 and which has parts designated by similar reference numerals, with the exception that the cam-like engagement of the lip and hook-like end of the tab is avoided in this embodiment of the invention. Thus the retainer 10ª has a lip 14ª which is disposed at right angles to the plane of the body portion of the retainer and the hook-like end of the tab 24ª has an end portion 27ª which extends in the same direction as the lip so that these parts firmly interlock even if it is attempted to separate the belts by the longitudinal sliding movement described with reference to Fig. 4. Thus, with this embodiment of the invention it is necessary to press the tab 24ª inwardly both when it is to be engaged with a retainer or when it is to be disengaged from the same; thus the parts are positively locked in position against disengagement under all conditions.

Fig. 10 illustrates an optional arrangement which may be employed either with the belt fastening arrangements which have been described or with the arrangements shown in Figs. 11 to 17. Thus, rather than depending upon a decorative member such as the member 3 to conceal the edges of the bail member 20 or the like, the belt may be shaped so that the overlapping end has a slightly greater width than the overlapped end. Thus, for example, the width of the belt may slightly increase from one end to the other or the overlapped end may have a slightly reduced width compared to that of the remainder of the belt.

An optional interlocking arrangement is shown in Figs. 11 to 17. Thus, an overlapping belt section 1ᵇ may be associated with an overlapped section 2ᵇ. The section 2ᵇ is provided with a plurality of individual retainers 10ᵇ, each of which provides a recess or socket to receive a suitable tab member. One of the members 10ᵇ, before it is secured to the belt, is shown more particularly in Fig. 17, this member in general resembling the member 10 of Fig. 8 and having corresponding extensions 12ᵇ which are received between the plies of the belt in the manner illustrated in Fig. 7. The exposed portion of this member, however, may be of generally semi-circular form and may have a pressed-out socket portion 14ᵇ which has a shape corresponding to that of a part of a circle somewhat greater than a semicircle. Thus the plane of the metal in the socket portion 14ᵇ may be parallel to the metal in the body portion of the retainer 10ᵇ but be disposed in a different plane, this relationship being shown particularly in Figs. 13 and 14.

The bail member 20ᵇ may be secured to the overlapping belt end 1ᵇ in the same manner as described with reference to the bail member 20 of Figs. 4 and 5. This member may have a body portion 21ᵇ bent up from a flat sheet of metal to provide the form of a box with open ends, the edges of the metal being juxtaposed at the mid portion of the overlapping end 1ᵇ, as shown in Fig. 14. This member may also be covered and concealed by a thin leather covering 22ᵇ or the like.

An opening preferably is provided in the central part of the bight portion of this member, i. e., the wall thereof that is in spaced parallel relation to the overlapping belt end 1ᵇ. A tab member 24ᵇ is slidably disposed in this opening and is provided with an enlarged end portion 27ᵇ adapted to fit within the socket 14ᵇ of a retainer 10ᵇ. The metal of the box-like member 21ᵇ is slightly depressed to provide a recess to receive this enlarged portion of the tab 24ᵇ, as shown in Fig. 16. The end portion of the tab is provided with a riveted connection 28 with a bowed leaf spring 29, the ends of which engage the face of the bight portion of the member 21ᵇ. This spring thus tends to urge the tab 24ᵇ toward this bight portion so that its enlarged end 27ᵇ may be received in the recess provided in the bight portion.

Obviously in this form of the invention, as in the forms illustrated in Figs. 1 to 9, the leather covering 22ᵇ or the like for the bail member 20ᵇ may fit somewhat loosely over the bight portion of this member, thus concealing the tab but permitting its movement.

When the belt ends shown, for example, in Fig. 13 are to be secured to each other, the overlapped belt end 2ᵇ is slid through the bail member until the desired region of adjustment is reached, whereupon pressure is applied by the thumb or finger to the covering 22ᵇ over the rivet-like end 28 of the tab member 24ᵇ, thus distorting the spring 29 and pushing the enlarged end of the tab member inwardly against the inner surface of the overlapped belt end 2ᵇ. This pressure may be effective in slightly compressing the material of the belt end, and the enlarged end of tab 24ᵇ may then be slid into a socket 14ᵇ of a retainer 10ᵇ by a slight relative longitudinal movement of the belt ends. Thereupon the pressure on the end of the tab member is released and the spring 29 is effective in holding the enlarged end of this member in interlocking engagement with the socket 14ᵇ of the retainer. Since the socket has a shape corresponding to a portion of a circle greater than a semicircle, relative longitudinal movement in either direction of the belt ends is prevented.

When it is desired to separate the belt ends, pressure may be applied to the end of member 28 so that the enlarged end of tab member 24ᵇ is again pressed against the inner surface of the belt end and the belt ends are then slid longitudinally relative to each other so that the tab is separated from the retainer.

However, if preferred, the belt sections may be separated by a relative sliding action such as is provided by moving the section 1ᵇ toward the left, as viewed in Fig. 13. This permits the enlarged end of the tab member to snap out of engagement with the retainer, an action which is permitted, due to the shape of these parts as will be more fully described. In either case the tab thereupon resumes its normal inactive position and it may slide over the adjoining retainers as the belt ends are separated.

It will be noted that the enlarged portion of the tab or plunger 24ᵇ is provided with a beveled surface, thus permitting its more ready engagement with and disengagement from the socket 14ᵇ of the retainer, this socket being provided with a correspondingly shaped portion. This portion at the open side of the socket cooperates with the shape of the socket, which is slightly more than semicircular in form, so that the tab may be moved out of the socket with a snap action without necessity of manual pressure on the tab.

One advantage of the present invention involves the arrangement of the fastening means so that the juxtaposed surfaces of the overlapping belt ends are held in slightly spaced relation, as shown, for example, in Figs. 4, 9 and 13. Thus the belt ends do not tend to rub upon each other when the person wearing the belt moves his body and any slight squeaking which might otherwise occur is avoided, while wearing or chafing of the glossed surface of the leather is eliminated.

Furthermore, it is to be noted that the provision of the longitudinally spaced retainers 10, 10ᵃ and 10ᵇ permits the overlapped belt section to be flexible and that in any position of adjustment the overlapped end which extends beyond the retainer which engages the tab member is held in place against the body by the overlapping section and that under any condition of adjustment there is no long free overlapping end which might tend to hang away from the remainder of the belt. Thus, one belt may be provided with a wide range of adjustment by providing the same with a large number of spaced retainers 10 or the like, and such a belt may be used by persons of different sizes and yet provide a neat appearance in each case.

It is evident that the present invention permits a positive interlocking means to be provided with such means concealed, not only from the front of the belt but from the top of the same, thus affording an unusually unobtrusive appearance and permitting the exposed overlapping belt end either to be plain, as shown in Fig. 10, to be provided with a small decorative metal member, as shown in Fig. 1, or to be provided with any suitable decoration not limited in size or structure by the restrictions imposed by the requirements of the fastening means, as is the case with conventional buckles.

It should be understood that the present disclosure is for the purpose of illustration only and that this invention includes all modifications and equivalents which fall within the scope of the appended claims.

I claim:

1. A belt comprising concealed fastening means to hold the ends of the belt in overlapping relation, said means comprising a bail member extending inwardly from the overlapping belt end, said bail member having a bight portion spaced inwardly from said end of the belt and being shaped to receive the overlapped end of the belt, interfitting means carried by said bight portion and the inner surface of the overlapped end detachably to secure the belt ends together, and yielding means also carried by the bight portion tending to disengage said interfitting means.

2. In combination with belt ends, a concealed fastening means to hold the belt ends in overlapping relation, said means comprising a bail member extending inwardly from the overlapping end of the belt, said bail member having a bight portion spaced inwardly from said end of the belt and being shaped to receive the overlapped end of the belt, a tab element on said bight portion, means providing a plurality of recesses at the inner surface of said overlapped end selectively to receive the tab element in interfitting relation therewith, resilient means tending to move said tab element to the rear of said recesses, and means at the back of said bight portion, operable by forward pressure against the action of said resilient means, to move said tab element into one of said recesses.

3. In combination with belt ends, a concealed fastening means to hold the belt ends in overlapping relation, said means comprising a bail member extending inwardly from the overlapping end of the belt, said bail member having a bight portion spaced inwardly from said end of the belt and being shaped to receive the overlapped end of the belt, a tab on said bight portion and projecting toward the inner surface of the overlapping end, a plurality of metal retainers spaced along the inner surface of the overlapping belt end, each of said retainers providing a portion to interfit with the tab, resilient means tending to move said tab to the rear of said retainers, and means at the back of said bight portion, operable by forward pressure against the action of said resilient means, to move said tab into engagement with one of said retainers.

4. In combination with belt ends, a concealed fastening means to hold the belt ends in overlapping relation, said means comprising a bail member extending inwardly from the overlapping end of the belt, said bail member having a bight portion spaced inwardly from said end of the belt and being shaped to receive the overlapped belt end, a tab element resiliently mounted on said bight portion, retainer means on the inner surface of said overlapped end, said tab element having an end resiliently urged toward the bight portion and selectively engageable in interfitting relation with various parts of said retaining means, and means for engaging the tab with said means by pressure applied at the inner face of the bight portion and toward the overlapping belt end.

5. In combination with belt ends, a concealed fastening means to hold the belt ends in overlapping relation, said means comprising a bail member extending inwardly from the overlapping end of the belt, said bail member having a bight portion spaced inwardly from said end of the belt and being shaped to receive the overlapped belt end, cooperating interfitting means carried by said bight portion and by the inner surface of the overlapped belt end, means for interengaging said means in interfitting relation when pressure is applied at the inner surface of the bight portion toward the overlapping end, and yielding means for disengaging said interfitting means when the belt ends are slid longitudinally relative to each other.

6. In combination with belt ends, a concealed fastening means to hold the belt ends in overlapping relation, said means comprising a bail member extending inwardly from the overlapping end of the belt, said bail member having a bight portion spaced inwardly from said end of the belt and being shaped to receive the overlapped belt end, a hook disposed on said bight portion, a plurality of retainers secured on the inner surface of the overlapped belt end and having portions engageable with said hook, said retainers having portions shaped to have a cam-like engagement with the end of the hook whereby the retainers and the hook may be released from engagement with each other by relative longitudinal movement of the belt ends.

7. A belt comprising a fastener attached to one end of the belt detachably to connect said end to the other end of the belt, the fastener having front and rear portions to receive said second end therebetween, said rear portion having a catch for interengagement in a recess on the rear face of the second belt end and yielding means carried by said rear portion tending to disengage the catch from the recess, whereby the belt ends may be separated lengthwise of the belt when the catch is disengaged from the recess.

8. A belt comprising a fastener attached to one end of the belt detachably to connect said end to the other end of the belt having a series of recesses on its rear face, the fastener having front and rear portions to receive said second end therebetween, means interconnecting said portions at each edge of the belt, said rear portion having a catch portion for interengagement with one of said recesses and a spring portion yieldingly resisting movement of the catch portion transversely of the plane of said first belt end.

9. A belt comprising a fastener attached to one end of the belt detachably to connect said end to the other end of the belt, including a fastener element on one end of the belt having a rear surface provided with a recess and a second fastener element on the other end of the belt having a rear wall provided with an opening and a catch yieldingly mounted at said opening for movement forwardly into engagement with said recess, and a flexible covering over the rear surface of said wall, said catch being actuated by pressure on the covering, whereby the garment inside the belt is protected by said covering from abrasion by said catch.

WEBSTER JONES.